United States Patent [19]

Takeuchi et al.

[11] Patent Number: 4,755,493
[45] Date of Patent: Jul. 5, 1988

[54] CERAMIC COMPOSITION FOR DIELECTRIC CERAMIC BODIES

[75] Inventors: Yukihisa Takeuchi, Nagoya; Hideo Masumori, Anjo, both of Japan

[73] Assignee: NGK Insulators, Ltd., Aichi, Japan

[21] Appl. No.: 915,540

[22] Filed: Oct. 6, 1986

[30] Foreign Application Priority Data

Oct. 11, 1985 [JP] Japan .................................. 60-227239

[51] Int. Cl.⁴ ...................... C04B 35/46; C04B 35/48; C04B 35/49
[52] U.S. Cl. ...................................... 501/134; 501/135; 501/136; 501/137; 501/138; 501/139; 252/62.9
[58] Field of Search ............... 501/134, 135, 136, 137, 501/138, 139; 252/62.9, 62.9 PZT

[56] References Cited

U.S. PATENT DOCUMENTS 4,551,357 11/1985 Takeuchi ............................... 427/96

Primary Examiner—William R. Dixon, Jr.
Assistant Examiner—Anthony Green
Attorney, Agent, or Firm—Parkhurst & Oliff

[57] ABSTRACT

A ceramic composition for dielectric ceramic bodies, having a major component consisting of a compound having a perovskite structure or a complex perovskite structure. The ceramic composition includes at least one inorganic peroxide selected from the group consisting of calcium peroxide, strontium peroxide and barium peroxide.

11 Claims, No Drawings

CERAMIC COMPOSITION FOR DIELECTRIC CERAMIC BODIES

BACKGROUND OF THE INVENTION

1. Field of the Invention

The present invention relates generally to a ceramic composition for dielectric ceramic materials for ceramic green sheets, press-molded shapes or pastes used for forming dielectric bodies or articles such as ceramic capacitors, thick-film capacitors and ceramic piezoelectric actuators. More particularly, the invention is concerned with a dielectric ceramic composition adapted to be suitably fired in a non-oxidizing atmosphere.

2. Discussion of the Prior Art

In a known method of fabrication of laminar ceramic capacitors or piezoelectric actuators, electrodes or other conductive members are printed on a dielectric ceramic green sheet, by using a conductor paste whose major component consists of a noble metal such as platinum or palladium that is stable in an oxidizing atmosphere. A plurality of such dielectric green sheets with conductive members formed thereon are superposed on each other, and the obtained stack of green sheets is fired in an oxidizing atmosphere. Suitable leads are formed on the fired ceramic body, for electrical connection of the electrodes to external elements.

The above known method is advantageous in that the ceramic material can be fired in air. However, the same method is disadvantageous from the standpoint of economy, since the method uses platinum, palladium or other expensive noble metals for the conductive members of the capacitors or actuators.

To solve the drawbacks of the above known method, it is considered to use a conductor paste whose major component consists of nickel, copper, molybdenum or other non-noble or base metals. This conductor paste is applied to suitable dielectric ceramic green sheets, and a stack of these green sheets is fired in a non-oxidizing atmosphere, whereby the desired dielectric cermaic article is prepared. This alternative method also suffers from inconveniences, which arise from the firing operation effected in a non-oxidizing atmosphere. For example, a compound having a perovskite structure or a complex perovskite structure included in the dielectric ceramic composition tends to be reduced or denatured, or oxides or compounds of bismuth, zinc, lead or other elements used as additives may be evaporated, during the firing operation. Therefore, the composition of the dielectric ceramic material is changed during the firing process in a non-oxidizing atmosphere. Thus, the alternative method does not permit the fabricated dielectric ceramic article to have a sufficiently dense ceramic structure. The dielectric ceramics produced according to the alternative method in question is likely to have a low dielectric constant and a high dielectric loss tangent (high dielectric dissipation factor).

SUMMARY OF THE INVENTION

It is therefore an object of the present invention to provide a ceramic composition which can be suitably fired in a non-oxidizing atmosphere, and which is capable of giving dielectric ceramic bodies having excellent electrical properties characterized by a high insulation resistance, a high dielectric constant, a low dielectric loss tangent, a high electromechanical coupling factor, and a high coefficient of piezoelectric strain.

The above object is achieved according to the invention which provides a ceramic composition for dielectric ceramic bodies, having a major component consisting of a compound having a perovskite structure or a complex perovskite structure, wherein the improvement comprises at least one inorganic peroxide selected from the group consisting of calcium peroxide, strontium peroxide and barium peroxide.

As indicated above, the dielectric ceramic composition according to the present invention consists essentially of a compound having a perovskite or complex perovskite structure, and at least one inorganic peroxide which is selected from the group consisting of calcium peroxide, strontium peroxide and barium peroxide. Accordingly, the instant dielectric ceramic composition has enhanced sinterability, and a dielectric ceramic body to be obtained from the instant dielectric ceramic composition will not be reduced or denatured during a firing process in a non-oxidizing atmosphere, resulting in a sufficiently dense ceramic structure. Further, the obtained dielectric ceramic body has improved electrical properties characterized by a high dielectric constant, a high insulation resistance and a low dielectric loss tangent. The dielectric ceramic body is also excellent in its piezoelectric properties, having a high electromechanical coupling factor, and a high coefficient of piezoelectric strain.

Generally, a compound of a perovskite structure or a complex perovskite structure is liable to be partially reduced or denatured if fired in an atmosphere having a low oxygen partial pressure, causing increased dielectric loss tangent and reduced break down voltage, and deterioration of other electrical properties. According to the present invention, such reduction and denaturation of the compound is effectively avoided by adding an inorganic peroxide of alkaline-earth metals, i.e., $CaO_2$, and/or $SrO_2$ and/or $BaO_2$.

The above effect obtained by a combination of the perovskite compound and the inorganic peroxide or peroxides is assumed to be attributed to a synergistic effect of the unique perovskite structure of the compound and the specific properties of the inorganic peroxide or peroxides of alkaline-earth metals selected from the group consisting of $CaO_2$, $SrO_2$ and $BaO_2$.

DETAILED DESCRIPTION OF THE INVENTION

A compound having a perovskite structure or a complex perovskite structure used as a major component of a dielectric ceramic composition according to the invention may be selected from any ceramic compounds which are known as materials for thick-film capacitors and ceramic capacitors and as ceramic piezoelectric materials. More specifically, the ceramic compound used according to the invention is generally selected from the group consisting of: $BaTiO_3$; $MgTiO_3$; $CaTiO_3$; $SrTiO_3$; $BaZrO_3$; $CaZrO_3$; $[(Ba_{1-x}Ca_x)O]_m(Ti_{1-y}Zr_y)O_2$; $BaSnO_3$; $CaSnO_3$; $[(Ba_xCa_ySr_z)O]_m(Ti_nZr_{1-n})O_2$; $PbTiO_3$; $PbZrO_3$; $Pb(Fe_{\frac{2}{3}}W_{\frac{1}{3}})O_3$; $Pb(Fe_{\frac{2}{3}}W_{\frac{1}{3}})_{1-x}Ti_xO_3$; $(Pb_xBa_y)TiO_3$; $(Pb_xCa_y)TiO_3$; $Pb(Fe_{\frac{2}{3}3-}W_{\frac{1}{3}})_x(Zn_{\frac{1}{3}}Nb_{\frac{2}{3}})_{1-x}O_3$; $(Pb_xSr_y)TiO_3$; $(Pb_xMg_y)TiO_3$; $(1-x-y) Pb(Ni_{\frac{1}{3}}Nb_{\frac{2}{3}})O_3—xPbZrO_3—yPbTiO_3$; and $Pb(Fe_{\frac{2}{3}}W_{\frac{1}{3}})O_3—Pb(Fe_{\frac{1}{2}}Nb_{\frac{1}{2}})O_3—Pb(Zn_{\frac{1}{3}}Nb_{\frac{2}{3}})O_3$. For improved sinterability and enhanced electrical properties of a dielectric ceramic body to be obtained, a compound of a perovskite structure including Ca, Sr or Ba is preferred. Further, for the same reasons, the following compounds of a complex perovskite structure are preferred: $[(Ba_{1-x}Ca_x)O]_m$ $(Ti_{1-y}Zr_y)O_2$; $[(Ba_xCa_ySr_z)O]_m$ $(Ti_nZr_{1-n})O_2$; $Pb(Fe_{\frac{2}{3}}W_{\frac{1}{3}})O_3$; $Pb(Fe_{\frac{2}{3}}W_{\frac{1}{3}})_{1-x}Ti_xO_3$; $Pb(Fe_{\frac{2}{3}}W_{\frac{1}{3}})_x$ $(Zn_{\frac{1}{3}}Nb_{\frac{2}{3}})_{1-x}O_3$; $(1-x-y)$ $Pb(Ni_{\frac{1}{3}}Nb_{\frac{2}{3}})O_3-xPbZrO_3-yPbTiO_3$; and $Pb(Fe_{\frac{2}{3}}W_{\frac{1}{3}})O_3-Pb(Fe_{\frac{1}{2}}Nb_{\frac{1}{2}})O_3-Pb(Zn_{\frac{1}{3}}Nb_{\frac{2}{3}})O_3$. Among the above-indicated compounds of a perovskite or complex perovskite structure, those compounds including Ca, Sr and/or Ba are particularly preferred, since $CaO_2$, $SrO_2$ and/or $BaO_2$ may include such alkaline-earth metals, and such inorganic peroxides facilitate adjustment of the chemical composition and consequently the electrical properties of a dielectric ceramic body that is produced from the ceramic composition in question. Namely, it is desirable that oxides of alkaline-earth metals to be included in a compound of a perovskite structure or a complex perovskite structure are given by means of decomposition of peroxides of alkaline-earth metals included in a starting material.

Among the inorganic peroxides $CaO_2$, $SrO_2$ and $BaO_2$, at least one of which is added to the instant ceramic composition according to the principle of the invention, $SrO_2$ is most preferred from the standpoint of sinterability and electrical properties of a dielectric ceramic body to be obtained from the ceramic composition. Further, for the same standpoint, it is desirable that the at least one inorganic peroxide is included in an amount by weight of 0.1–40 parts, preferably 1–30 parts, with respect to 100 parts by weight of the perovskite or complex perovskite compound. For improved sinterability, it is preferred that the average particle size of a powder of the inorganic peroxide is held within a range of about 0.1–10 microns.

The ceramic composition for dielectric ceramic bodies according to the present invention may contain, as a sintering aid or aids, a suitable amount of a glass which includes at least one oxide selected from the group consisting of $SiO_2$, $Li_2O$, $BaO$, $SrO$, $CaO$, $B_2O_3$, $PbO$, $MgO$, $Al_2O_3$, $ZnO$, $TiO_2$, $Na_2O$, $K_2O$ and $ZrO_2$. Further, the instant ceramic composition may include an oxide or a compound of calcium, strontium, manganese, praseodymium, samarium, bismuth, niobium, zinc, lead, cobalt, and elements of the platinum group. Preferably, the above-indicated glass as a sintering aid, and/or the above-indicated oxide or compound is/are included in a total amount by weight of 0.1 to 10 parts, with respect to 100 parts by weight of the perovskite or complex perovskite compound.

The dielectric ceramic composition according to the invention may be suitably used as materials for ceramic green sheets, press-molded shapes or ceramic pastes for forming laminar ceramic capacitors, thick-film capacitors, laminar ceramic actuators, and other dielectric ceramic articles. Such green sheets, press-molded shapes or ceramic pastes may be produced by: initially calcinating a starting material to prepare a perovskite structure or a complex perovskite structure; then mixing the prepared perovskite compound with a suitable inorganic peroxide or peroxides, and adding an organic binder to the mixture, or alternatively mixing the perovskite compound, the inorganic peroxide and the organic binder at the same time; and forming the obtained mixture into the desired green sheets, press-molded shape, or ceramic paste, according to a known method. Alternatively, the ceramic composition of the invention may be prepared by mixing a suitable organic binder with a ceramic composition of the invention which includes an inorganic peroxide or peroxides, and a mixture of carbonate, and/or hydroxide, and/or chloride, and/or nitrate, and/or oxide, which gives a perovskite compound or a complex perovskite compound by firing thereof. The thus prepared mixture of the ceramic composition and the organic binder is used to form the desired ceramic green sheet, press-molded shape or ceramic paste. However, a dielectric ceramic article to be obtained from the green sheet, press-molded shape or paste will exhibit better electrical properties, by using the former method, that is, by preparing a ceramic composition containing a perovskite compound or a complex perovskite compound which has been formed by calcination of a suitably prepared starting mixture.

The organic binder is included in the ceramic composition, in an amount by weight of preferably 0.5% to 30%.

Subsequently, a conductor paste containing a powder of a suitable conductive metal is applied to the prepared ceramic green sheet or ceramic shaped body such as a thick-film dielectric body, for example. Non-noble or base metals may be used as a material of the conductor paste. The conductor paste is peferably formed of a powder of nickel, copper, molybdenum or tungsten, or an alloy and/or a compound thereof. More preferably, the conductor paste is formed of a powder of nickel.

The green sheets, thick-film dielectric bodies or other ceramic shaped bodies with the conductor patterns formed of the conductor paste, are stacked by a lamination or printing technique to prepare an intended multi-layered structure. The prepared structure is finally fired into a desired end product. The ceramic composition according to the invention makes it possible to accomplish a firing operation in a non-oxidizing atmosphere such as a nitrogen ($N_2$) gas, a mixture gas of nitrogen ($N_2$) containing a small proportion of oxygen, a mixture gas of nitrogen ($N_2$) and hydrogen ($H_2$), or a mixture gas of nitrogen ($N_2$), hydrogen ($H_2$) and water vapaor ($H_2O$). Obviously, the firing process may be achieved in an ambient air or other oxidizing atmosphere, without an adverse effect on the properties on the fired dielectric ceramic product.

Described more specifically, it is possible to use different firing atmospheres for different ranges of firing temperature. For example, the ambient air is used at the firing temperatures from the room temperature up to about 500°–600° C. is effected. Subsequently, $N_2$ atmosphere containing a small percentage of oxygen, $N_2+H_2$ atmosphere, and $N_2+H_2O$ atmosphere may be used as needed for higher temperature ranges, as the firing temperature is elevated up to the final level. In short, the firing atmosphere suitably used for the ceramic composition of the present invention is construed to mean an atmosphere which does not oxidize the applied conductor paste to such an extent that the functions of the electrodes or other conductive members formed by firing of the paste are adversely affected or deteriorated as a result of the oxidization of the paste. Thus, the firing atmosphere is selected depending upon the specific material of the conductor paste, or the material of the electrodes or other conductive members.

To further clarify the principle of the present invention, the following examples are given for illustrative purpose only. However, it is to be understood that these examples should not be construed to limit the scope of the invention, and that the invention may be embodied with various changes and modifications which may occur to those skilled in the art, in the light of the foregoing detailed description of the invention and the following examples, without departing from the spirit and scope of the invention defined in the appended claims.

diameter of 16 mm and a thickness of 0.5 mm was obtained.

TABLE 1

| EXAMPLES | BASIC COMPOSITIONS | PEROXIDES | PEROXIDE CONTENT (%) | ADDITIVES | ADDITIVE CONTENT (%) |
| --- | --- | --- | --- | --- | --- |
| PRESENT INVENTION | | | | | |
| 1 | $BaTiO_3$ | $SrO_2$ | 5 | $Nb_2O_5, MnO_2$ | 2 |
| 2 | $BaTiO_3$ | $CaO_2$ | 3 | $Nb_2O_5, MnO_2$ | 2 |
| 3 | $BaO + BaO_2 + TiO_2$ | $BaO_2$ | — | $Nb_2O_5, MnO_2$ | 2 |
| 4 | $Ba_{0.9}Ca_{0.1}Ti_{0.8}Zr_{0.2}O_3$ | $SrO_2$ | 10 | $Li_2O-SiO_2$ | 5 |
| 5 | $Ba_{0.9}Ca_{0.1}Ti_{0.8}Zr_{0.2}O_3$ | $CaO_2 + BaO_2$ | 20 | $Li_2O-SiO_2$ | 5 |
| 6 | $Pb(Fe_{1/3}W_{1/6})(Zn_{1/6}Nb_{1/3})O_3$ | $SrO_2$ | 7 | — | — |
| 7 | $Pb(Fe_{2/3}W_{1/3})_{0.9}Ti_{0.1}O_3$ | $SrO_2 + CaO_2$ | 30 | — | — |
| 8 | $Pb(Ni_{1/15}Nb_{2/15})Zr_{0.4}Ti_{0.4}O_3$ | $SrO_2$ | 10 | — | — |
| 9 | $Pb(Ni_{1/15}Nb_{2/15})Zr_{0.4}Ti_{0.4}O_3$ | $CaO_2$ | 15 | — | — |
| COMPARATIVES | | | | | |
| 10 | $BaTiO_3$ | — | 0 | $Nb_2O_5, MnO_2$ | 2 |
| 11 | $Ba_{0.9}Ca_{0.1}Ti_{0.8}Zr_{0.2}O_3$ | — | 0 | $Li_2O-SiO_2$ | 5 |
| 12 | $Pb(Fe_{1/3}W_{1/6})(Zn_{1/6}Nb_{1/3})O_3$ | — | 0 | — | — |
| 13 | $Pb(Fe_{2/3}W_{1/3})_{0.9}Ti_{0.1}O_3$ | — | 0 | — | — |
| 14 | $Pb(Ni_{1/15}Nb_{2/15})Zr_{0.4}Ti_{0.4}O_3$ | — | 0 | — | — |

EXAMPLES

Initially, starting materials such as $BaCO_3$, $CaCO_3$, $TiO_2$, $ZrO_2$, PbO, $Fe_2O_3$, NiO, $WO_3$, ZnO, $Nb_2O_5$ and $SrCO_3$ were prepared and mixed in a ball mill in suitable proportions as indicated in Table 1. The obtained mixtures were milled, dried, and calcinated at temperatures of 600°–1200° C. Thus, basic compositions of Examples 1–10 of Table 1 were prepared.

Subsequently, at least one inorganic peroxide selected from the group consisting of $CaO_2$, $SrO_2$ and $BaO_2$ was added in an amount as indicated in Table 1, to 100 parts by weight of the individual basic compositions of Examples 1–10. Further, additives such as glasses and oxides were added as desired, as indicated in Table 1. In this manner, ceramic compositions of Examples 1–10 according to the invention were obtained. It is noted that the ceramic composition of Example 3 was prepared by mixing 2% by weight of glass additives to 100 parts by weight of the basic composition consisting essentially of BaO, $BaO_2$ and $TiO_2$. The proportion of $TiO_2$, $BaO_2$ and BaO of the basic composition was 1:0.5:0.5, in the order of description.

Comparative Examples 10–14 were prepared without an inorganic peroxide included in the ceramic compositions. These examples are also shown in Table 1.

To the thus prepared ceramic compositions of Table 1, there were added organic binders including acrylate polymer, glycerine, condensed phosphate, etc. The organic binder and the ceramic composition of each example were mixed and milled in a ball mill, and the powder mixture was formed by a doctor-blade technique into a green sheet having a thickness of 60 microns. Further, an organic binder consisting of polyvinyl alcohol was mixed to each ceramic composition of Table 1. The mixture powder was press-molded at about 1 ton/cm$^2$, whereby a press-molded disk having a Then, a conductor paste whose major component is a nickel powder, and a thick-film dielectric paste consisting of the same ceramic composition as the green sheet, were applied by printing alternately to the green sheet of Examples 4–9 and 11–14, whereby ten layers including electrode layers were formed on the green sheet. Thus, ceramic laminar structures were prepared. On the other hand, a conductor paste whose major component is nickel was applied to the opposite major sufaces of the press-molded disk of Examples 1–3 and 10.

The thus prepared ceramic laminar structures and press-molded disks were fired in a $N_2$ atmosphere containing 2% of oxygen, up to about 500° C. Then, the laminar structures and disks were fired in a $N_2$ atmosphere, up to the final temperature as indicated in Table 2. Thus, the fired laminar structures and disks of Table 2 were produced.

The laminar structures and disks of Examples 1–7 and 10–13 were tested for their dielectric constant and dielectric loss tangent at 1 KHz, and for their specific resistance at DC 100 V at the room temperature. The measurements are listed in Table 2. For measuring the electromechanical coupling factor and piezoelectric strain coefficient, the samples were immersed in an oil bath of 90° C., and 1–4 kV/mm DC current was applied to the samples. The electromechanical coupling factor and piezoelectric strain coefficient of the polarized samples (Examples 8, 9 and 14) were calculated by measuring their resonance frequency and anti-resonance frequency. The results of measurements are indicated in Table 3.

It will be seen from Tables 2 and 3 that the ceramic compositions of the invention including at least one inorganic peroxide selected from the group consisting of $CaO_2$, $SrO_2$ and $BaO_2$ enable the corresponding dielectric ceramic bodies or articles to exhibit excellent sinterability and electrical properties, even where the unfired laminar structures or press-molded bodies are fired in a non-oxidizing atmosphere or atmospheres.

TABLE 2

| EXAMPLES | FORM | FIRING TEMP. (°C.) | SINTERABILITY | DIELECTRIC CONSTANT | DIELECTRIC LOSS TANGENT (%) | SPECIFIC RESISTANCE (Ωcm) |
| --- | --- | --- | --- | --- | --- | --- |
| PRESENT INVENTION | | | | | | |

TABLE 2-continued

| EXAMPLES | FORM | FIRING TEMP. (°C.) | SINTERABILITY | DIELECTRIC CONSTANT | DIELECTRIC LOSS TANGENT (%) | SPECIFIC RESISTANCE (Ωcm) |
| --- | --- | --- | --- | --- | --- | --- |
| 1 | DISK | 1300 | GOOD | 2700 | 0.4 | $10^{12}$ |
| 2 | DISK | 1300 | GOOD | 2100 | 0.8 | $10^{11}$ |
| 3 | DISK | 1300 | GOOD | 2200 | 0.5 | $10^{11}$ |
| 4 | LAMINAR STRUCTURE | 1100 | GOOD | 9000 | 0.7 | $10^{12}$ |
| 5 | LAMINAR STRUCTURE | 1100 | GOOD | 7900 | 0.9 | $10^{11}$ |
| 6 | LAMINAR STRUCTURE | 900 | GOOD | 2200 | 1.2 | $10^{12}$ |
| 7 | LAMINAR STRUCTURE | 900 | GOOD | 9800 | 5.0 | $10^{12}$ |
| COMPARATIVES | | | | | | |
| 10 | DISK | 1300 | SLIGHTLY POOR | <1000 | >10 | <$10^8$ |
| 11 | LAMINAR STRUCTURE | 1100 | POOR | INSUFFICIENTLY DENSE STRUCTURE | | |
| 12 | LAMINAR STRUCTURE | 900 | POOR | <1000 | >10 | <$10^8$ |
| 13 | LAMINAR STRUCTURE | 900 | POOR | <1000 | >10 | <$10^8$ |

TABLE 3

| | EXAMPLES | FORM | FIRING TEMP. (°C.) | SINTERABILITY | ELECTROMECHANICAL COUPLING FACTOR (%) | PIEZOELECTRIC STRAIN COEFFICIENT (m/V) |
| --- | --- | --- | --- | --- | --- | --- |
| PRESENT INVENTION | 8 | LAMINAR STRUCTURE | 1000 | GOOD | 70 | 60 |
| | 9 | LAMINAR STRUCTURE | 1000 | GOOD | 60 | 50 |
| COMPARATIVE | 14 | LAMINAR STRUCTURE | 1000 | POOR | <10 | <10 |

What is claimed as new and desired to be secured by Letters Patent of the United States is:

1. A ceramic composition for forming by firing thereof dielectric ceramic bodies which have a major component consisting essentially of a compound having a perovskite structure or a complex perovskite structure, wherein the improvement comprises the addition of at least one inorganic peroxide selected from the group consisting of calcium peroxide, strontium peroxide and barium peroxide.

2. The ceramic composition of claim 1, wherein said at least one inorganic peroxide is present in an amount by weight of 0.1-40 parts, with respect to 100 parts by weight of said compound.

3. The ceramic composition of claim 2, wherein said at least one inorganic peroxide is present in an amount by weight of 1-30 parts, with respect to 100 parts by weight of said compound.

4. The ceramic composition of claim 1, wherein said at least one inorganic peroxide has an average particle size of 0.1-10 microns.

5. The ceramic composition of claim 1 wherein said compound is selected from the group consisting of: $BaTiO_3$; $MgTiO_3$; $CaTiO_3$; $SrTiO_3$; $BaZrO_3$; $CaZrO_3$; $[(Ba_{1-x}Ca_x)O]_m(Ti_{1-y}Zr_y)O_2$; $BaSnO_3$; $CaSnO_3$; $[(Ba_xCa_ySr_z)O]_m(Ti_nZr_{1-n})O_2$; $PbTiO_3$; $PbZrO_3$; $Pb(Fe_{\frac{2}{3}}W_{\frac{1}{3}})O_3$; $Pb(Fe_{\frac{2}{3}}W_{\frac{1}{3}})_{1-x}Ti_xO_3$; $(Pb_xBa_y)TiO_3)$; $(Pb_xCa_y)TiO_3$; $Pb(Fe_{\frac{2}{3}}W_{\frac{1}{3}})_x(Zn_{\frac{1}{3}}Nb_{\frac{2}{3}})_{1-x}O_3$; $(Pb_xSr_y)TiO_3$; $(Pb_xMg_y)TiO_3$; $(1-x-y)Pb(Ni_{\frac{1}{3}}Nb_{\frac{2}{3}})O_3$—$xPbZrO_3$—$yPbTiO_3$; and $Pb(Fe_{\frac{2}{3}}W_{\frac{1}{3}})O_3$—$Pb(Fe_{\frac{1}{2}}Nb_{\frac{1}{2}})O_3$—$Pb(Zn_{\frac{1}{3}}Nb_{\frac{2}{3}})O_3$.

6. The ceramic composition of claim 1, wherein said compound consists of a perovskite structure including at least one element selected from the group consisting of Ca, Sr or Ba.

7. The ceramic composition of claim 5, wherein said compound consists of a complex perovskite structure selected from the group consisting of: $[(Ba_{1-x}Ca_x)O]_m(Ti_{1-y}Zr_y)O_2$; $[(Ba_xCa_ySr_z)O]_m(Ti_nZr_{1-n})O_2$; $Pb(Fe_{\frac{2}{3}}W_{\frac{1}{3}})O_3$; $Pb(Fe_{\frac{2}{3}}W_{\frac{1}{3}})_{1-x}Ti_xO_3$; $Pb(Fe_{\frac{2}{3}}W_{\frac{1}{3}})_x(Zn_{\frac{1}{3}}Nb_{\frac{2}{3}})_{1-x}O_3$; $(1-x-y)Pb(Ni_{\frac{1}{3}}Nb_{\frac{2}{3}})O_3$—$xPbZrO_3$—$yPbTiO_3$; and $Pb(Fe_{\frac{2}{3}}W_{\frac{1}{3}}O)_3$—$Pb(Fe_{\frac{1}{2}}Nb_{\frac{1}{2}})O_3$—$Pb(Zn_{\frac{1}{3}}Nb_{\frac{2}{3}})O_3$.

8. The ceramic composition of claim 1, further comprising 0.1 to 10 parts by weight with respect to 100 parts by weight of said compound of at least one member selected from at least one of groups A and B:

A. at least one sintering aid selected from the group consisting of $SiO_2$, $Li_2O$, $BaO$, $SrO$, $CaO$, $B_2O_3$, $PbO$, $MgO$, $Al_2O_3$, $ZnO$, $TiO_2$, $Na_2O$, $K_2O$ and $ZrO_2$, and B. at least one material selected from the group consisting of oxides or compounds of calcium, strontium, manganese, praseodymium, samarium, bismuth, niobium, zinc, lead, cobalt, and oxides or compounds of the platinum group.

9. The ceramic composition of claim 1, further comprising an organic binder in an amount by weight of 0.5 to 30%.

10. The ceramic composition of claim 1, wherein said at least one inorganic peroxide is strontium peroxide.

11. A ceramic composition for forming dielectric ceramic bodies comprising a compound having a perovskite structure or a complex perovskite structure and at least one inorganic peroxide selected from the group consisting of calcium peroxide, strontium peroxide and barium peroxide.

* * * * *